United States Patent
Zhou (10) Patent No.: US 10,980,040 B2
(45) Date of Patent: Apr. 13, 2021

(54) METHOD AND APPARATUS FOR DETERMINING TRANSMISSION TIME INTERVAL, BASE STATION AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/423,875

(22) Filed: May 28, 2019

(65) Prior Publication Data
US 2019/0281617 A1 Sep. 12, 2019

Related U.S. Application Data

(63) Continuation of application No. PCT/CN2016/107686, filed on Nov. 29, 2016.

(51) Int. Cl.
*H04L 5/00* (2006.01)
*H04W 8/24* (2009.01)
(Continued)

(52) U.S. Cl.
CPC ....... *H04W 72/1215* (2013.01); *H04L 5/0053* (2013.01); *H04L 5/0064* (2013.01);
(Continued)

(58) Field of Classification Search
CPC .......... H04J 11/0023–0093; H04J 2011/0096; H04L 5/003–0098; H04W 8/18–245;
(Continued)

(56) References Cited

U.S. PATENT DOCUMENTS 6,961,589 B2 11/2005 Pautonnier
2015/0334686 A1 11/2015 Ji
(Continued)

FOREIGN PATENT DOCUMENTS

CN 101400072 A 4/2009
CN 101414870 A 4/2009
(Continued)

OTHER PUBLICATIONS

International Search Report (including English translation) and Written Opinion issued in PCT/CN2016/107686, dated Jun. 7, 2017, 9 pages.

(Continued)

*Primary Examiner* — Timothy J Weidner
(74) *Attorney, Agent, or Firm* — Arch & Lake LLP (57) ABSTRACT

A method and an apparatus are provided for adjusting TTI, a base station and UE. The method includes: a type of a data service used by UE is determined; based on the type of the data service used by the UE, first length information and a first carrier frequency for the first TTI are allocated for the UE; and downlink control signaling is sent to the UE, where the downlink control signaling carries the first length information and the carrier frequency for the first TTI. With the technical solutions of the present disclosure, the UE uses the first TTI with a relatively short length for the latency-sensitive data service, and the UE appropriately uses the first TTI with a relatively long length for the latency-insensitive data service, thereby ensuring the UE is able to flexibly adjust the length of the first TTI when processing the data service.

8 Claims, 9 Drawing Sheets

(51) Int. Cl.
*H04W 28/02* (2009.01)
*H04W 72/04* (2009.01)
*H04W 72/12* (2009.01)
*H04W 84/04* (2009.01)
*H04W 88/06* (2009.01)
*H04W 88/10* (2009.01)
*H04W 92/10* (2009.01)

(52) U.S. Cl.
CPC .......... *H04L 5/0082* (2013.01); *H04L 5/0087* (2013.01); *H04W 8/245* (2013.01); *H04W 28/0215* (2013.01); *H04W 72/042* (2013.01); *H04W 72/048* (2013.01); *H04W 72/0446* (2013.01); *H04W 72/0453* (2013.01); *H04W 72/0493* (2013.01); *H04W 72/1205* (2013.01); *H04W 72/1257* (2013.01); *H04W 72/1263* (2013.01); *H04W 72/1289* (2013.01); *H04W 84/042* (2013.01); *H04W 88/06* (2013.01); *H04W 88/10* (2013.01); *H04W 92/10* (2013.01)

(58) Field of Classification Search
CPC ..... H04W 28/02–26; H04W 48/02–20; H04W 56/001–0025; H04W 72/005–14; H04W 74/002–0891; H04W 84/02; H04W 84/04–045; H04W 88/02; H04W 88/04–12; H04W 92/02; H04W 92/04; H04W 92/10; H04W 92/16; H04W 92/20
See application file for complete search history.

(56) References Cited

U.S. PATENT DOCUMENTS

| | | | |
|---|---|---|---|
| 2018/0083749 A1* | 3/2018 | Lee | H04L 5/0094 |
| 2018/0115380 A1* | 4/2018 | Li | H04L 5/0094 |
| 2018/0295642 A1* | 10/2018 | Miao | H04W 72/1289 |

FOREIGN PATENT DOCUMENTS

| | | | |
|---|---|---|---|
| CN | 101415227 A | | 4/2009 |
| CN | 103384187 A | | 11/2013 |
| CN | 105850177 A | | 8/2016 |
| CN | 106102180 A | | 11/2016 |
| WO | 2016160330 A1 | | 10/2016 |

OTHER PUBLICATIONS

Written Opinion of the International Searching Authority issued in Application No. PCT/CN2016/107686, dated Jun. 7, 2017, WIPO, (4p).
First Chinese Office Action and Search Report Issued in Application No. 201680001654.3 dated Jul. 2, 2019 and English Translation (16p).

* cited by examiner

METHOD AND APPARATUS FOR DETERMINING TRANSMISSION TIME INTERVAL, BASE STATION AND USER EQUIPMENT

CROSS REFERENCE TO RELATED APPLICATIONS

The present application is a continuation application of PCT Application No. PCT/CN2016/107686 filed on Nov. 29, 2016, which is incorporated herein by reference in its entirety.

TECHNICAL FIELD

The present disclosure relates to the field of communication technologies, and in particular, to a method and an apparatus for determining a transmission time interval, a base station and user equipment.

BACKGROUND

After years of evolution of the technology versions, the wireless communication technology has gradually evolved from 2G ($2^{nd}$-Generation), 3G, and 4G to 5G, which may satisfy more and more user requirements. The main improved functions include the data transmission rate, coverage, latency, capacity and so on. After entering 5G, it is important to meet the requirements of different types of services. For example, the data services include enhanced Mobile Broad Band (eMBB), massive Machine Type Communication (mMTC), Ultra Reliable Low Latency Communication (URLLC) and so on. The above data services have different requirements for latency. For example, when the URLLC service is applied in Internet of Vehicles, low-latency is needed, the real-time requirements are high, and the service needs to be created in time; and the mMTC service is generally insensitive to latency, and thus the data may be transmitted with a relatively long time interval. Since the length of the Transmission Time Interval (TTI) in the related art is fixed, latency requirements of the different data services are not satisfied.

SUMMARY

To overcome the problems in the related art, examples of the present disclosure provide a method and an apparatus for determining a transmission time interval, a base station and user equipment, so as to ensure that the user equipment is able to use a TTI with a length matched with a data service when processing the data service.

According to a first aspect of the present disclosure, a method of determining a TTI is provided, which is applied in a base station. The method may include: determining a type of a data service used by user equipment; allocating first length information for a first TTI and a first carrier frequency for the first TTI to the user equipment based on the type of the data service used by the user equipment; and sending downlink control signaling to the user equipment, where the downlink control signaling carries the first length information and the carrier frequency for the first TTI.

According to a second aspect of the present disclosure, a method of determining a TTI is provided, which is applied in user equipment. The method may include: receiving broadcast signaling from a base station; obtaining second length information for a second TTI in a preset frequency range from the broadcast signaling, where the preset frequency range is within a base station carrier frequency range; demodulating downlink control signaling from the base station with a length corresponding to the second length information to obtain first length information for a first TTI associated with the user equipment, where the first length information is determined based on a type of a service currently used by the user equipment.

According to a third aspect of the present disclosure, an apparatus for determining a TTI is provided, which is applied in a base station and includes: a first determining module, configured to determine a type of a data service used by user equipment; a TTI allocating module, configured to allocate first length information for a first TTI and a first carrier frequency for the first TTI to the user equipment based on the type of the data service used by the user equipment determined by the first determining module; and a first sending module, configured to send downlink control signaling to the user equipment, where the downlink control signaling carries the first length information and the carrier frequency for the first TTI allocated by the TTI allocating module to the user equipment.

According to a fourth aspect of examples of the present disclosure, an apparatus for determining a TTI is provided, which is applied in user equipment. The apparatus may include: a receiving module, configured to receive broadcast signaling from a base station; an analyzing module, configured to obtain second length information for a second TTI in a preset frequency range from the broadcast signaling received by the receiving module, where the preset frequency range is within a base station carrier frequency range; a demodulating module, configured to demodulate downlink control signaling from the base station with a length corresponding to the second length information to obtain first length information for a first TTI associated with the user equipment, where the first length information is determined based on a type of a service currently used by the user equipment, and the second length information is obtained by the analyzing module.

According to a fifth aspect of examples of the present disclosure, a base station is provided and includes: a processor, and a memory to store processor executable instructions. The processor is caused to: determine a type of a data service used by user equipment; allocate first length information for a first TTI and a first carrier frequency for the first TTI to the user equipment based on the type of the data service used by the user equipment; and send downlink control signaling to the user equipment, where the downlink control signaling carries the first length information and the carrier frequency for the first TTI.

According to a sixth aspect of the present disclosure, user equipment is provided and includes: a processor; and a memory to store processor executable instructions. The processor is caused to: receive broadcast signaling from a base station; obtain second length information for a second TTI in a preset frequency range from the broadcast signaling, where the preset frequency range is within a base station carrier frequency range; and demodulate downlink control signaling from the base station with a length corresponding to the second length information to obtain first length information for a first TTI associated with the user equipment, where the first length information is determined based on a type of a service currently used by the user equipment.

It is understood that the above general description and the following detailed description are merely exemplary and explanatory, which does not limit the present disclosure.

BRIEF DESCRIPTION OF THE DRAWINGS

The accompanying drawings, which are incorporated in and constitute a part of this specification, illustrate examples consistent with the present disclosure and, together with the specification, serve to explain the principles of the disclosure.

DETAILED DESCRIPTION OF THE EMBODIMENTS

Examples will be described in detail here with the examples thereof shown in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 1A:
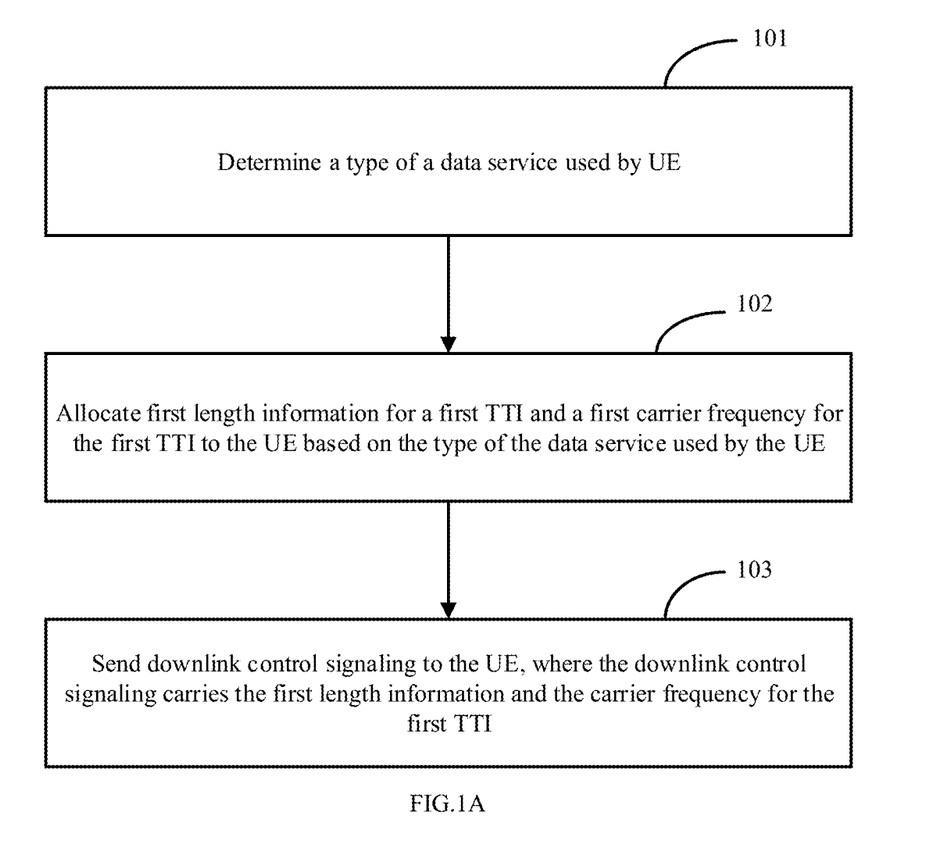
FIG. 1A is a flowchart of a method of determining a TTI according to an example of the present disclosure.
Figure 1B:
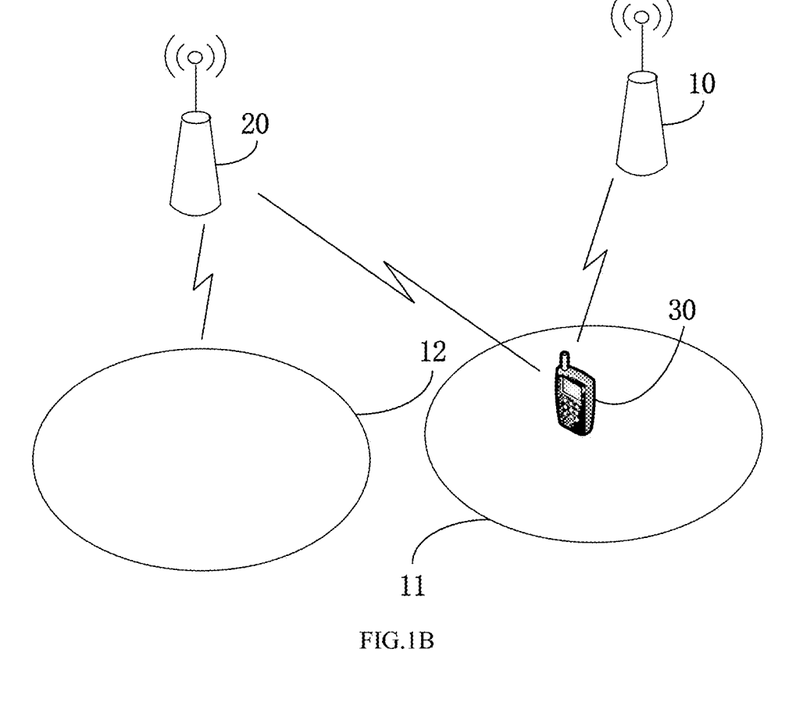
FIG. 1B is a scenario of the method of determining a TTI according to the example shown in FIG. 1A.

FIG. 1A is a flowchart of a method of determining a TTI according to an example of the present disclosure. FIG. 1B is a scenario of the method of determining a TTI according to the example shown in FIG. 1A. The method of determining a TTI may be applied in a base station. As shown in FIG. 1A, the method of determining a TTI includes the following steps 101-103.

At step 101, a type of a data service used by user equipment (UE) is determined.

In an example, the base station may obtain the type of the current data service in the UE based on the data service interaction between the base station and the UE. The type of the data service is, for example, eMBB, mMTC, URLLC and so on.

At step 102, first length information for a first TTI and a first carrier frequency for the first TTI are allocated to the UE based on the type of the data service used by the UE.

In an example, if the type of the data service represents a low-latency service type, the base station may allocate the first TTI with a relatively short length, such as, 0.5 milliseconds, to the UE. If the type of the data service represents a high-latency service type, the base station may allocate the first TTI with a relatively long length, such as, 4 milliseconds, to the UE. In addition, the base station may allocate an available carrier frequency to the UE based on the usage of resources in a cell, so that the UE may work normally on the carrier frequency and interference caused by using an inappropriate carrier frequency to other pieces of UE in the cell is avoided.

At step 103, downlink control signaling is sent to the UE, where the downlink control signaling carries the first length information and the carrier frequency for the first TTI.

In an example, the downlink control signaling may be sent to the UE through a Physical Downlink Control Channel (PDCCH), and the first length information for the first TTI and the carrier frequency for the first TTI are written into a set field in the PDCCH.

In an example, the first length information may be a specific length. For example, the first length information is 1 millisecond. The first length information may also be a mark number corresponding to a length. For example, the first length information is a numeral "01", which indicates a length of 1 millisecond; and the first length information is a numeral "10", which indicates a length of 5 milliseconds. In this case, both the base station and the UE may pre-agree which mark number corresponding to which length.

In an exemplary scenario, as shown in FIG. 1B, the mobile network is a Long Term Evolution (LTE) network and the base station is an evolved node B (eNB) as an example. The scenario shown in FIG. 1B includes an eNB 10, an eNB 20, and UE 30, where, the eNB 10 covers a plurality of cells, FIG. 1B only exemplarily shows the cell 11, the eNB 20 covers a plurality of cells, and FIG. 1B only exemplarily shows the cell 12. The eNB 20 is a neighboring base station of the eNB 10. The eNB 10 may allocate a TTI matched with a type of a data service of UE to the UE in the cell, based on the type of the data service of the UE in the current cell 11 and the time-frequency resource currently used in the cell 11. For example, when the UE 30 in the cell 11 has accessed the eNB 10, the data service currently used by the UE 30 is corresponding to a low-latency service. The UE 30 may demodulate a PDCCH based on a reference TTI length (such as, a TTI of 1 millisecond) provided by the eNB 10. After a preferred TTI length (such as, 0.5 milliseconds) and a corresponding carrier frequency (such as, 100 MHz) that the UE 30 is able to use are demodulated from the PDCCH, the UE 30 adjusts the frequency to 100 MHz and adjusts the TTI length from 1 millisecond to 0.5 milliseconds.

In the example, since the base station may allocate the first TTI to the UE according to the type of the data service used by the UE, the UE uses a TTI with a relatively short length for the latency-sensitive data service, and appropriately uses a TTI with a relatively long length for the latency-insensitive data service, thereby ensuring that the UE is able to flexibly adjust the length of the TTI when processing the data service.

Figure 2A:
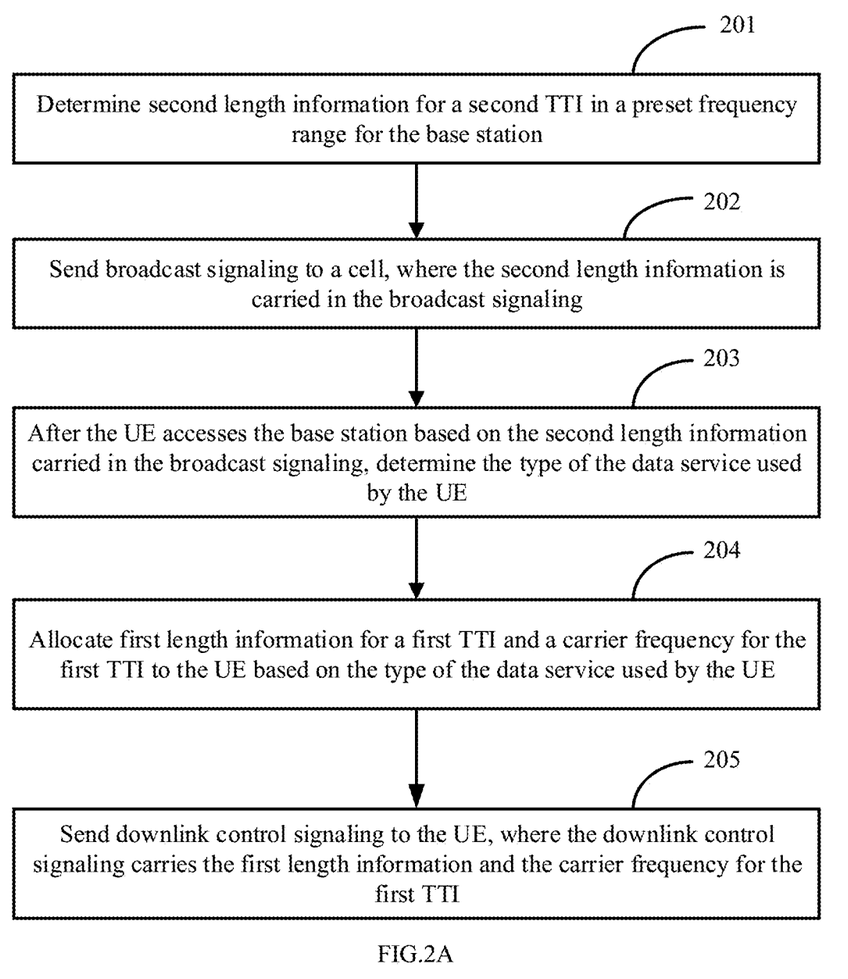
FIG. 2A is a flowchart of a method of determining a TTI according to another example of the present disclosure.
Figure 2B:
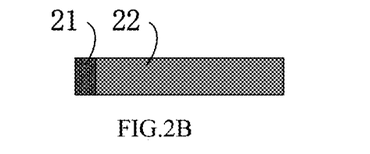
FIG. 2B is a first schematic diagram of a length of a TTI according to the example shown in FIG. 2A.
Figure 2C:
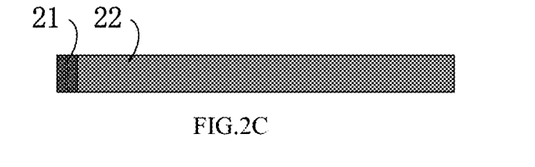
FIG. 2C is a second schematic diagram of a length of a TTI according to the example shown in FIG. 2A.
Figure 2D:
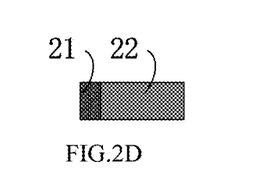
FIG. 2D is a third schematic diagram of a length of a TTI according to the example shown in FIG. 2A.

FIG. 2A is a flowchart of a method of determining a TTI according to another example. FIG. 2B is a first schematic diagram of a length of a TTI according to the example shown in FIG. 2A. FIG. 2C is a second schematic diagram of a length of a TTI according to the example shown in FIG. 2A. FIG. 2D is a third schematic diagram of a length of a TTI according to the example shown in FIG. 2A. The example is exemplarily illustrated by using the method provided by the above examples of the present disclosure, taking the base station how to control the access of the UE as an example, and combining FIG. 1B. As shown in FIG. 2A, the following steps are included.

At step 201, second length information for a second TTI in a preset frequency range for the base station is determined, where the preset frequency range is located within a base station carrier frequency range.

In an example, the TTI used in the preset frequency range has a fixed value, such as, 1 millisecond. In an example, the preset frequency range may be located in a center of the base station carrier frequency range. For example, if the base station carrier frequency range is 100 MHz-180 MHz, the preset frequency range is 130 MHz-150 MHz. It is understood by those skilled in the art that the numerals in the above frequency ranges are only exemplary illustration to facilitate understanding the technical solutions of the present disclosure, and a specific frequency range of the carrier and the preset frequency range may be determined based on different communication protocols, and the present disclosure does not limit the specific numerals.

In an example, the second TTI may be a default TTI provided by the base station, and the default TTI may be used as a reference TTI with respect to the first TTI. That is, the UE accesses the base station by using the reference TTI, and then the UE adjusts to use a TTI (i.e., the first TTI in the present disclosure) suitable for the UE based on a type of a specific data service.

At step 202, broadcast signaling is sent to a cell, where the second length information is carried in the broadcast signaling.

At step 203, after the UE accesses the base station based on the second length information carried in the broadcast signaling, a type of a data service used by the UE is determined.

At step 204, first length information for a first TTI and a carrier frequency for the first TTI are allocated to the UE based on the type of the data service used by the UE.

At step 205, downlink control signaling is sent to the UE, where the downlink control signaling carries the first length information and the carrier frequency for the first TTI.

Descriptions of the steps 203 to 205 may refer to the description of the example shown in FIG. 1A, which is not described in detail herein.

The relationship between the length of the first TTI and the length of the second TTI will be described below.

The second TTI in the present disclosure is shown in FIG. 2B, where the numeral 21 indicates a PDCCH, and the numeral 22 indicates a Physical Downlink Shared Channel (PDSCH), and the length of the second TTI shown in FIG. 2B is, for example, 1 millisecond. The first TTI allocated by the base station to the UE is shown in FIG. 2C, where the length of the first TTI is twice that of the second TTI, that is, in a case that the length of the second TTI shown in FIG. 2B is 1 millisecond, the first TTI shown in FIG. 2C is 2 milliseconds. FIG. 2D shows another length of the first TTI, where the length of the first TTI is a half that of the second TTI, that is, in a case that the length of the second TTI shown in FIG. 2B is 1 millisecond, the length of the first TTI shown in FIG. 2D is ½ millisecond. It should be noted that the lengths of the TTIs shown in FIG. 2B-FIG. 2D are only exemplary. When the base station allocates TTIs of different lengths to the UE based on actual service requirements, the UE may also analyze the TTIs of different lengths from the downlink control signaling, where the length of the first TTI is an integer multiple or an integer fraction of a length of the second TTI. Further, the length of the first TTI is a multiple of $2^n$ or $½^n$ to the length of the second TTI, where n is a positive integer. In a case that the length of the first TTI is a multiple of $2^n$ or $½^n$ to the length of the second TTI, the interference of the PDSCH to the PDCCH may be reduced as much as possible.

In the example, the base station firstly sends the broadcast signaling, such that the UE obtains the second length information for the second TTI in the preset frequency range of the base station, analyzes the downlink control signaling according to the length represented by the second length information, and further obtains the first length information of the first TTI suitable for the UE, thereby ensuring that the UE may flexibly use time-frequency resources based on the requirements of the data service and preventing the UE from losing relevant service data.

Figure 3A:
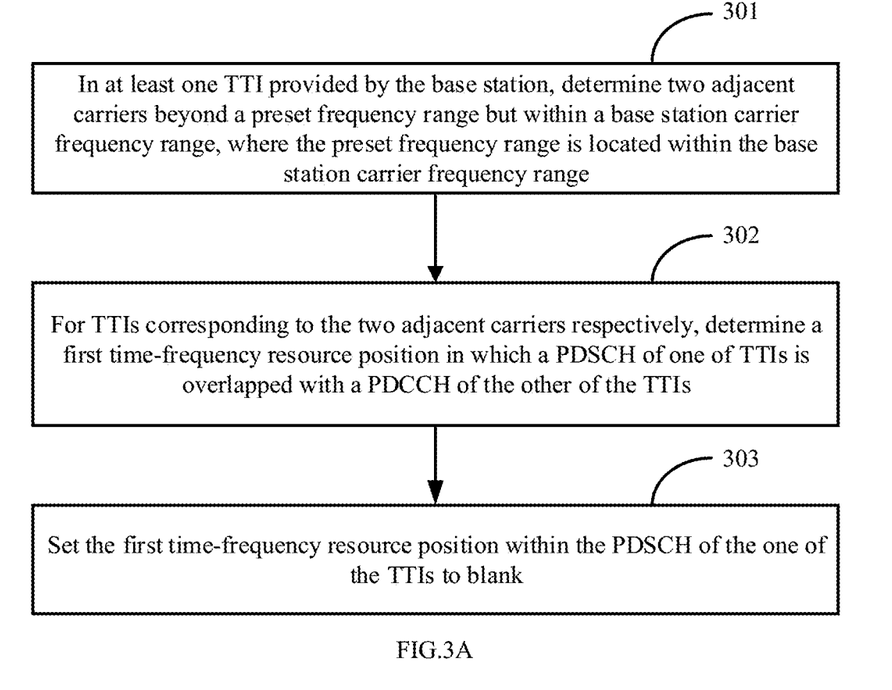
FIG. 3A is a flowchart of a method of determining a TTI according to still another example of the present disclosure.
Figure 3B:
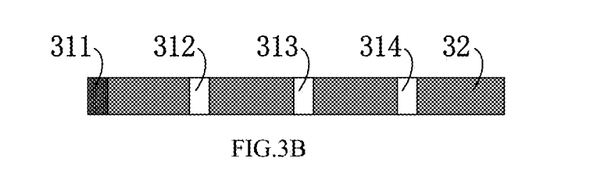
FIG. 3B is a first schematic diagram of a length of a TTI according to the example shown in FIG. 3A.
Figure 3C:
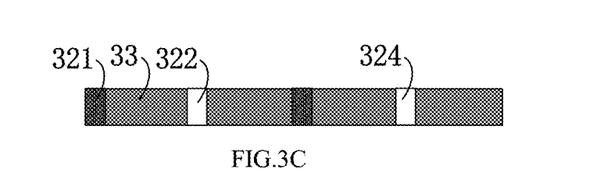
FIG. 3C is a second schematic diagram of a length of a TTI according to the example shown in FIG. 3A.
Figure 3D:
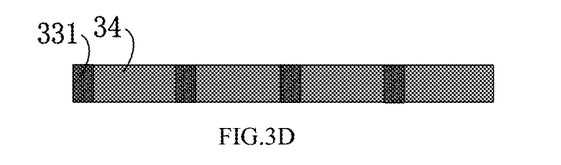
FIG. 3D is a third schematic diagram of a length of a TTI according to the example shown in FIG. 3A.

FIG. 3A is a flowchart of a method of determining a TTI according to still another example of the present disclosure. FIG. 3B is first schematic diagram of a length of a TTI according to the example shown in FIG. 3A. FIG. 3C is a second schematic diagram of a length of a TTI according to the example shown in FIG. 3A. FIG. 3D is a third schematic diagram of a length of a TTI according to the example shown in FIG. 3A. The example is exemplarily illustrated by using the methods provided by the above examples of the present disclosure, taking how to set the overlapped first time-frequency resource position in TTIs in the adjacent carriers as an example, and combining FIG. 1B. As shown in FIG. 3A, the following steps are included.

At step 301, in at least one TTI provided by the base station, two adjacent carriers beyond a preset frequency range but within a base station carrier frequency range are determined, where the preset frequency range is located within the base station carrier frequency range.

In an example, the TTI used in the preset frequency range is a fixed value, such as, 1 millisecond.

Corresponding to the exemplary description of the example shown in FIG. 2A, the base station carrier frequency range is 100 MHz-180 MHz, the preset frequency range is 130 MHz-150 MHz, the frequency ranges beyond the preset frequency range but within the base station carrier frequency range include 100 MHz-130 MHz and 150 MHz-180 MHz, and the two adjacent carriers are located within 100 MHz-130 MHz or 150 MHz-180 MHz.

At step 302, for TTIs corresponding to the two adjacent carriers respectively, a first time-frequency resource position in which a PDSCH of one of the TTIs is overlapped with a PDCCH of the other of the TTIs is determined.

At step 303, the first time-frequency resource position within the PDSCH of the one of the two TTIs is set to blank.

Exemplary illustration is given below combined with FIG. 3B-FIG. 3D. The TTIs shown in FIG. 3B-FIG. 3D are the TTIs used by the eNB 10, where FIG. 3B and FIG. 3D show the first TTIs of different lengths. FIG. 3B shows a first TTI with a length of 2 milliseconds and including PDCCH 311 and PDSCH 32. FIG. 3D shows four consecutive first TTIs, each of which has a length of 0.5 milliseconds and includes PDCCH 331 and PDSCH 34. FIG. 3C shows two consecutive second TTIs, each of which has a length of 1 millisecond and includes a PDCCH 321 and a PDSCH 33. For the sake of brevity, parts having the same meaning in FIG. 3B-FIG. 3D are not repeatedly labeled.

In the cell 11 shown in FIG. 1B, one piece of UE (named as first UE) transmits control signaling and service data based on the first TTI shown in FIG. 3B, another piece of UE (named as second UE) transmits control signaling and service data base on the first TTI shown in 3D, and the first UE and the second UE transmit service data through the adjacent carrier. For example, the carrier frequency used by the first UE is 100 MHz, and the carrier frequency used by the second UE is 101 MHz. Since the length of the first TTI shown in FIG. 3B is greater than the length of the first TTI shown in FIG. 3D, the PDSCH in the first TTI shown in FIG. 3B may interfere with the PDCCH in the first TTI shown in FIG. 3D. To avoid that the PDSCH in FIG. 3B interferes with the PDCCH in FIG. 3D, the first time-frequency resource position, such as the position corresponding to numeral 312, numeral 313 and numeral 314 in the PDSCH 32 shown in FIG. 3B, in which the PDSCH shown in FIG. 3B is overlapped with the PDCCH shown in FIG. 3D may be determined. The position corresponding to numeral 312, numeral 313 and numeral 314 in the PDSCH shown in FIG. 3B is set to blank. In other words, the first time-frequency resource position is within an overlapped resource between a PDSCH of one of the TTIs and a PDCCH of the other of the TTIs. The first time-frequency resource position may be a position in which the time-frequency resource, such as a subframe, a time slot or a min slot, a symbol or the like, associated with the PDSCH 32 is located.

Similarly, when the first UE and the second UE respectively use the TTIs shown in FIG. 3D and FIG. 3C on the adjacent carriers to transmit data, the first time-frequency resource position indicated by numeral 322 and numeral 324 in FIG. 3C may be set to blank to avoid that FIG. 3C interferes with the control signaling in FIG. 3D.

In the example, by setting the first time-frequency resource position in the PDSCH of one of the TTIs to blank, service data interfering to control signaling of other TTIs may be avoided, and the reliability of the base station when controlling the UE may be improved.

Figure 4A:
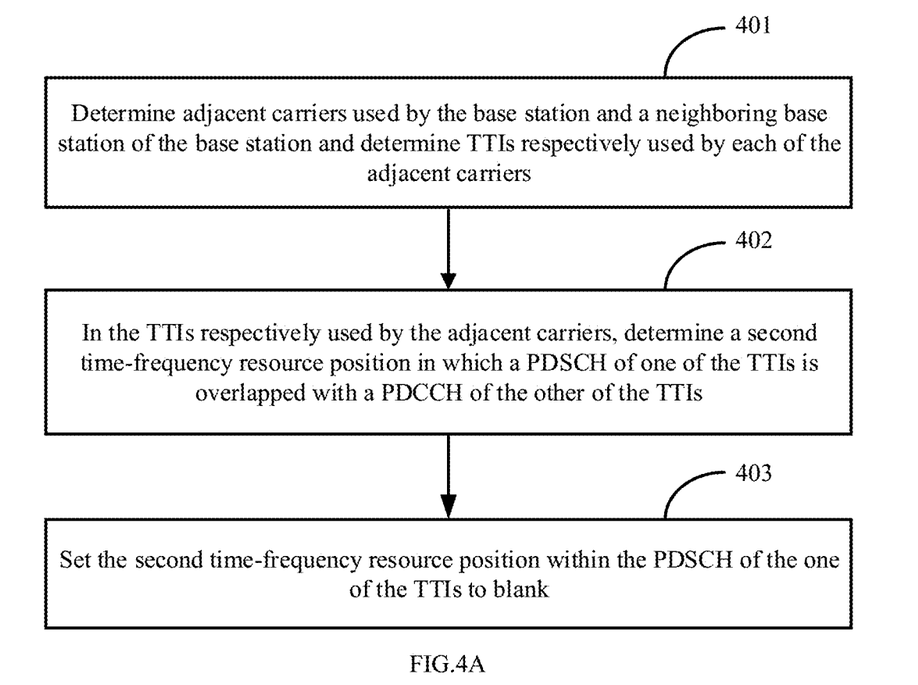
FIG. 4A is a flowchart of a method of determining a TTI according to still another example of the present disclosure.
Figure 4B:
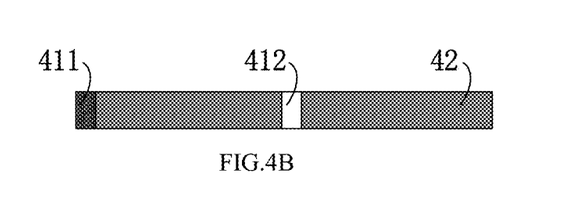
FIG. 4B is a first schematic diagram of a length of a TTI according to the example shown in FIG. 4A.
Figure 4C:
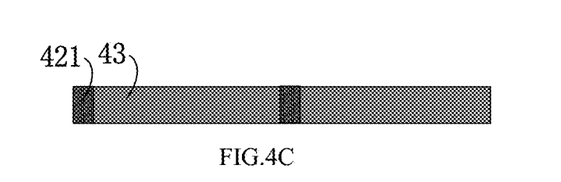
FIG. 4C is a second schematic diagram of a length of a TTI according to the example shown in FIG. 4A.

FIG. 4A is a flowchart of a method of determining a TTI according to still another example of the present disclosure. FIG. 4B is a first schematic diagram of a length of a TTI according to the example shown in FIG. 4A. FIG. 4C is a second schematic diagram of a length of a TTI according to the example shown in FIG. 4A. The example is exemplarily illustrated by using the methods provided by the above examples of the present disclosure, taking how to set overlapped first time-frequency resource position in TTIs in the adjacent carriers as an example, and combining FIG. 1B. As shown in FIG. 4A, the following steps are included.

At step 401, adjacent carriers used by a base station and a neighboring base station of the base station and TTIs respectively used by each of the adjacent carriers are determined.

In an example, the eNB 10 may obtain the length information of the TTI used by the eNB 20 based on the X2 interface. To avoid that the base station interferes with the adjacent carrier of the neighboring base station, TTIs respectively used by the base station and the neighboring base station may be determined, and the carriers respectively used by the base station and the neighboring base station may be determined.

At step 402, in the TTIs respectively used by the adjacent carriers, a second time-frequency resource position in which a PDSCH of one of the respective TTIs is overlapped with a PDCCH of the other of the respective TTIs is determined.

At step 403, the second time-frequency resource position within the PDSCH of the one of the respective TTIs is set to blank.

Exemplary illustration is given below combined with FIG. 4B-FIG. 4C. The TTI shown in FIG. 4B is a TTI used by the eNB 10. The TTI shown in FIG. 4C is a TTI used by the eNB 20. FIG. 4B shows a first TTI with a length of 2 milliseconds and including PDCCH 411 and PDSCH 42. FIG. 4C shows two consecutive first TTIs each of which has a length of 1 millisecond and includes PDCCH 421 and PDSCH 43.

In the cell 11 shown in FIG. 1B, one piece of UE (named as first UE) transmits control signaling and service data based on the first TTI shown in FIG. 4B. In the cell 12, another piece of UE (named as third UE) transmits control signaling and service data based on the first TTI shown in FIG. 4C. The first UE and the third UE transmit service data through the adjacent carriers, for example, the carrier frequency used by the first UE is 100 MHz, and the carrier frequency used by the third UE is 101 MHz. Since the length of the first TTI shown in FIG. 4B is greater than the length of the first TTI shown in FIG. 4C, the PDSCH in the first TTI shown in FIG. 4B may interfere with the PDCCH in the first TTI shown in FIG. 4C. To avoid that the PDSCH shown in FIG. 4B interferes to the PDCCH shown in FIG. 4C, the second time-frequency resource position, such as the position corresponding to numeral 412 in the PDSCH 42 shown in FIG. 4B, in which the PDSCH shown in FIG. 4B is overlapped with the PDCCH 421 shown in FIG. 4C may be determined. The position corresponding to numeral 412 in the PDSCH shown in FIG. 4B is set to blank. The second time-frequency resource position may be a position in which the time-frequency resource, such as a subframe, a time slot or a min slot, a symbol or the like, associated with the PDSCH 42 is located. The second time-frequency resource 412 is within an overlapped resource between a PDSCH 42 of one of the TTIs and a PDCCH 421 of the other of the TTIs.

It should be noted that FIG. 4B and FIG. 4C are only an exemplary description. For the TTIs of different lengths, the overlapped time-frequency resource position in the PDSCH may be set to blank in a similar manner as described above, thereby avoiding interference to the overlapped control signaling in other TTIs.

In the example, the second time-frequency resource position located in the PDSCH of any TTIs is set to blank. In this way, during the process of transmitting the data service, it may prevent the base station from generating interference to the neighboring base station in transmitting the control signaling, and it may improve the reliability of the neighboring base station when controlling the corresponding UE.

Figure 5:
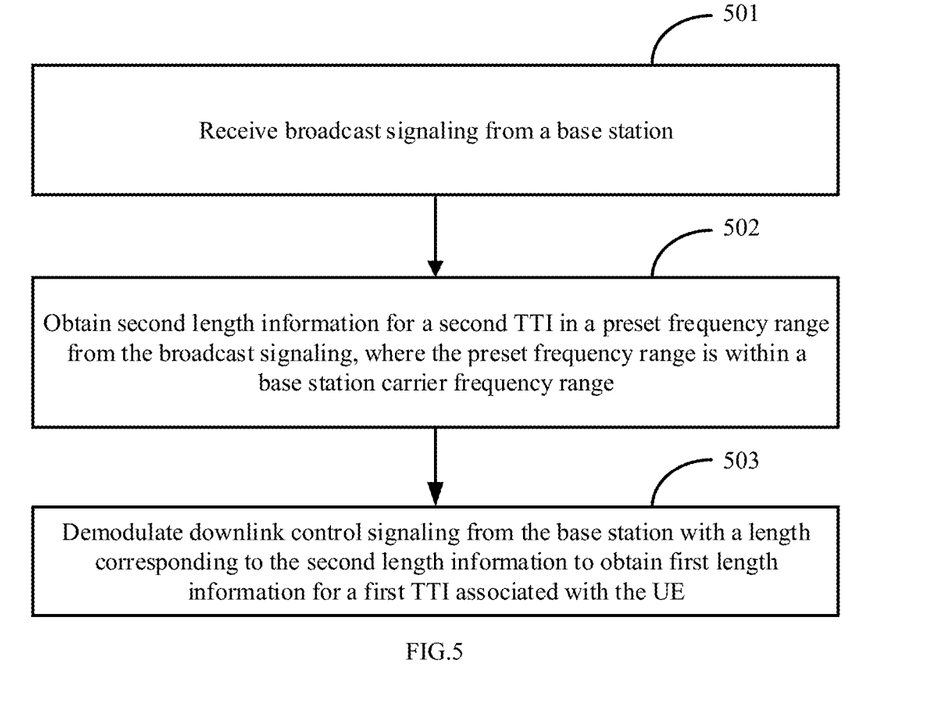
FIG. 5 is a flowchart of a method of determining a TTI according to yet another example of the present disclosure.

FIG. 5 is a flowchart of a method of determining a TTI according to yet another example of the present disclosure. The data transmission method may be applied to UE, and the example is exemplarily illustrated by combining FIG. 1B. As shown in FIG. 5, The method of determining a TTI includes the following steps 501-503.

At step 501, broadcast signaling from a base station is received.

The relevant description of the broadcast signaling may refer to the relevant description of the example shown in FIG. 2A, which is not described in detail herein.

At step 502, second length information for a second TTI in a preset frequency range is obtained from the broadcast signaling, where the preset frequency range is within a base station carrier frequency range.

The relevant description of the length of the second TTI may refer to the relevant description of the example shown in FIG. 2A, which is not described in detail herein.

At step 503, downlink control signaling sending from the base station is demodulated with a length corresponding to the second length information to obtain first length information for a first TTI associated with the UE, where the first length information is determined based on a type of a service currently used by the UE.

The relationship between the length of the first TTI and the length of the second TTI may refer to the relevant description of the example shown in FIG. 2A, which is not described in detail herein.

In the example, the TTIs of different lengths are used for different data services to ensure that the latency-sensitive data service for the UE may use a TTI with a relatively short length and the latency-insensitive data service may appropriately use a TTI with a relatively long length, such that the UE can flexibly adjust the length of the TTI when processing the data service.

Figure 6:
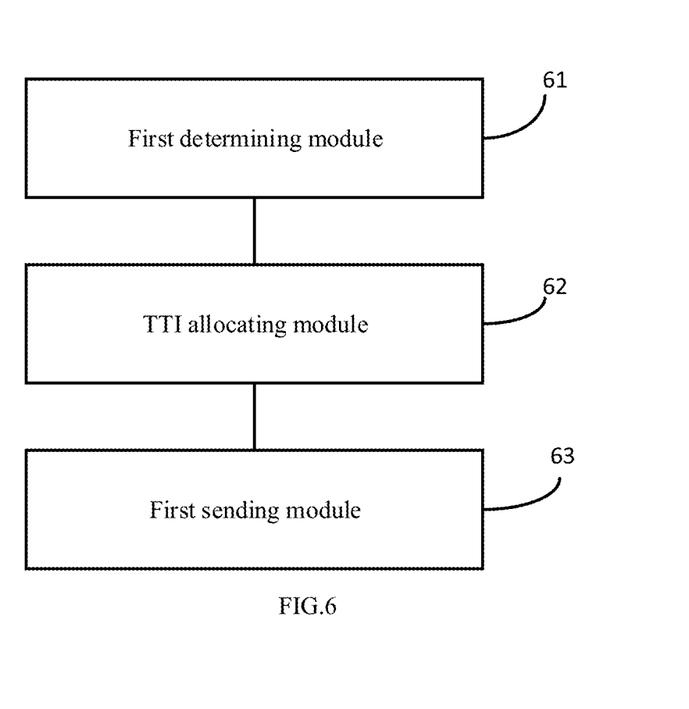
FIG. 6 is a schematic diagram of a structure of an apparatus for determining a TTI according to an example of the present disclosure.

FIG. 6 is a schematic diagram of a structure of an apparatus for determining a TTI according to an example of the present disclosure. As shown in FIG. 6, the apparatus for determining a TTI includes:

a first determining module 61, configured to determine a type of a data service used by user equipment;

a TTI allocating module 62, configured to allocate first length information for a first TTI and a first carrier frequency for the first TTI to the user equipment based on the type of the data service used by the user equipment determined by the first determining module 61; and a first sending module 63, configured to send downlink control signaling to the user equipment, where the downlink control signaling carries the first length information and the carrier frequency for the first TTI allocated by the TTI allocating module 62 to the user equipment.

Figure 7:
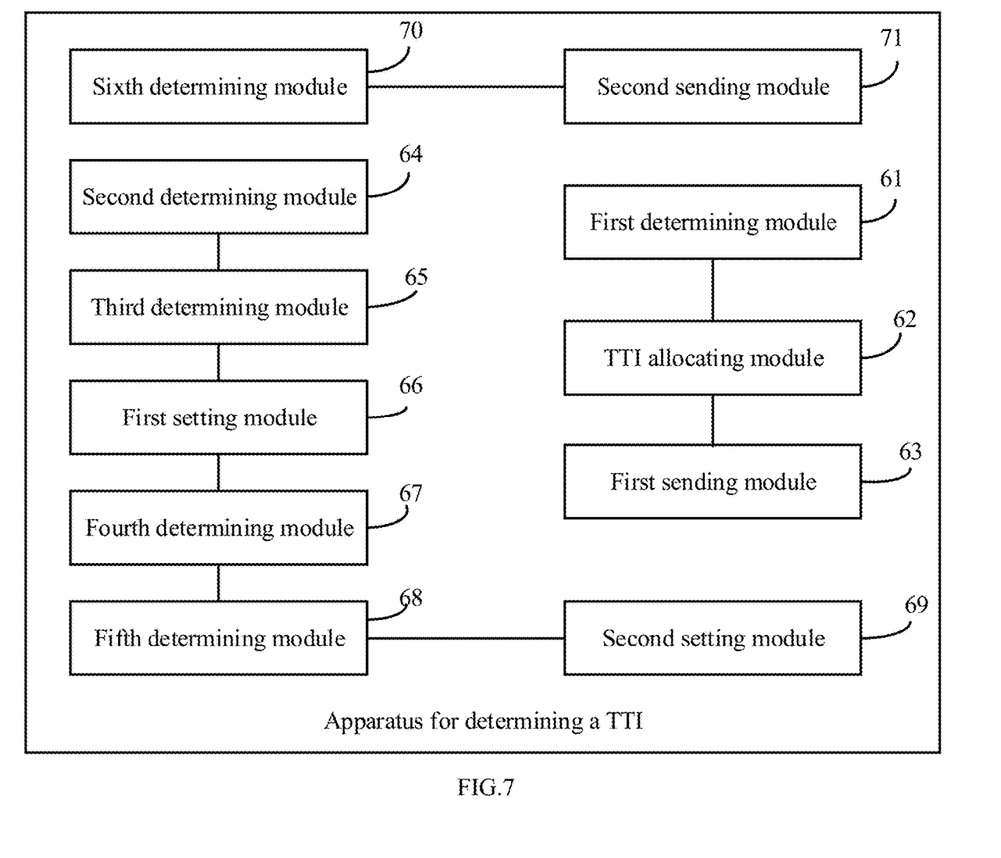
FIG. 7 is a schematic diagram of a structure of an apparatus for determining a TTI according to another example of the present disclosure.

FIG. 7 is a schematic diagram of a structure of an apparatus for determining a TTI according to another example of the present disclosure. As shown in FIG. 7, on the basis of the example shown in FIG. 6, in an example, the apparatus may further include:

a second determining module 64, configured to in at least one TTI provided by the base station, determine two adjacent carriers beyond a preset frequency range but within a base station carrier frequency range;

a third determining module 65, configured to, for TTIs corresponding to the two adjacent carriers respectively, determine a first time-frequency resource position in which a physical downlink shared channel of one of the TTIs is overlapped with a physical downlink control channel of the other of the TTIs, where the two adjacent carriers determined by the second determining module 64 corresponds to the TTIs respectively; and a first setting module 66, configured to set the first time-frequency resource position within the physical downlink shared channel of the one of the TTIs to blank, where the first time-frequency resource position is determined by the third determining module 65.

In an example, the apparatus may further include:

a fourth determining module 67, configured to determine adjacent carriers used by the base station and a neighboring base station of the base station, and determine TTIs respectively used by each of the adjacent carriers;

a fifth determining module 68, configured to determine a second time-frequency resource position in which a physical downlink shared channel of one of the TTIs is overlapped with a physical downlink control channel of the other of the TTIs, where the TTIs respectively used by each of the adjacent carriers are determined by the fourth determining module 67; and a second setting module 69, configured to set the second time-frequency resource position within the physical downlink shared channel of the one of the TTIs to blank, where the second time-frequency resource position is determined by the fifth determining module 68.

In an example, the apparatus may further include:

a sixth determining module 70, configured to determine second length information for a second TTI in a preset frequency range for the base station, where the preset frequency range is located within the base station carrier frequency range; and a second sending module 71, configured to send broadcast signaling to a cell, where the second length information determined by the sixth determining module 70 is carried in the broadcast signaling.

In an example, a length of the first TTI is an integer multiple or an integer fraction of a length of the second TTI.

In an example, the length of the first TTI is a multiple of $2^n$ or $\frac{1}{2}^n$ to the length of the second TTI, wherein n is a positive integer.

Figure 8:
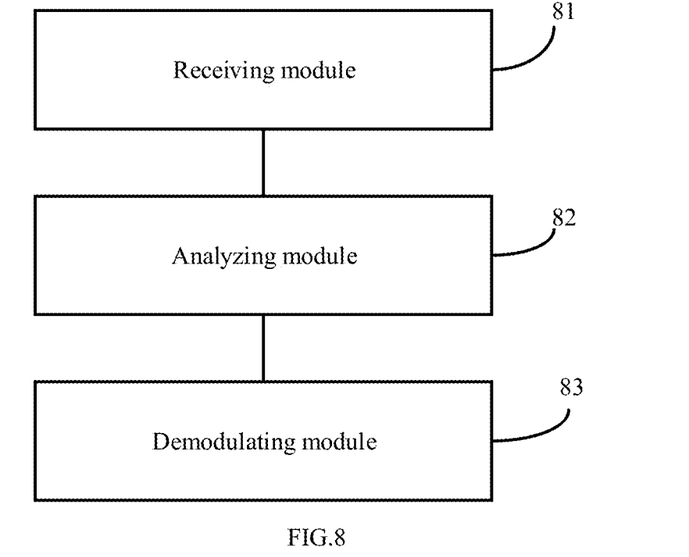
FIG. 8 is a schematic diagram of a structure of an apparatus for determining a TTI according to still another example of the present disclosure.

FIG. 8 is a schematic diagram of a structure of an apparatus for determining a TTI according to still another example of the present disclosure. As shown in FIG. 8, the apparatus for determining a TTI includes:

a receiving module 81, configured to receive broadcast signaling from a base station;

an analyzing module 82, configured to obtain second length information for a second TTI in a preset frequency range from the broadcast signaling received by the receiving module 81, where the preset frequency range is within a base station carrier frequency range;

a demodulating module 83, configured to demodulate downlink control signaling from the base station with a length corresponding to the second length information to obtain first length information for a first TTI associated with the user equipment, where the first length information is determined based on a type of a service currently used by the user equipment, and the second length information is obtained by the analyzing module 82.

In an example, a length of the second TTI is an integer multiple or an integer fraction of a length of the first TTI.

In an example, the length of the second TTI is a multiple of $2^n$ or $\frac{1}{2}^n$ to the length of the first TTI, wherein n is a positive integer.

For the apparatuses in the above examples, the specific manner by which each module performs operations has been described in detail in examples related to the methods, and is not described in detail herein.

Figure 9:
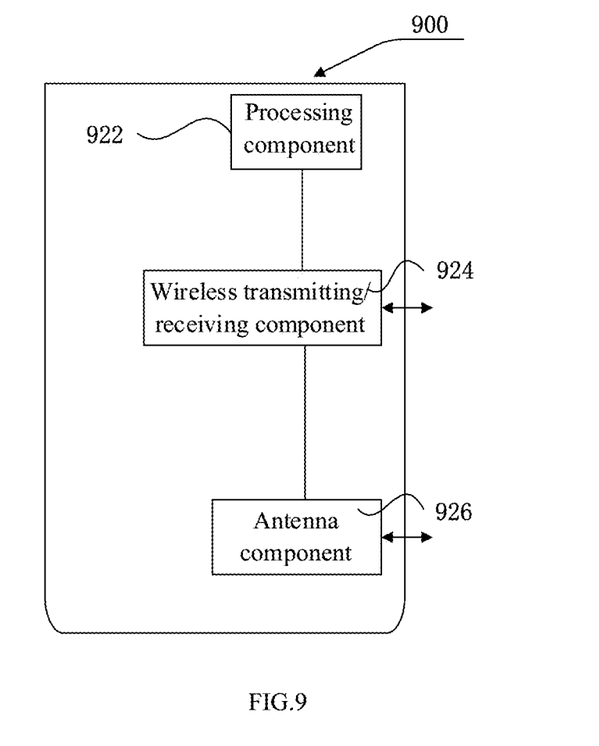
FIG. 9 is a schematic diagram of a structure of an apparatus suitable for determining a TTI according to an example of the present disclosure.

FIG. 9 is a schematic diagram of a structure of an apparatus suitable for determining a TTI according to an example of the present disclosure. The apparatus 900 may be provided as a base station. Referring to FIG. 9, the apparatus 900 includes a processing component 922, a wireless transmitting/receiving component 924, an antenna component 926, and a signal processing component specific to a wireless interface. The processing component 922 may further include one or more processors.

One of the processing components 922 may be configured to:
    determine a type of a data service used by user equipment;
    allocate first length information for a first TTI and a first carrier frequency for the first TTI to the user equipment based on the type of the data service used by the user equipment; and
    send downlink control signaling to the user equipment, where the downlink control signaling carries the first length information and the carrier frequency for the first TTI.

Figure 10:
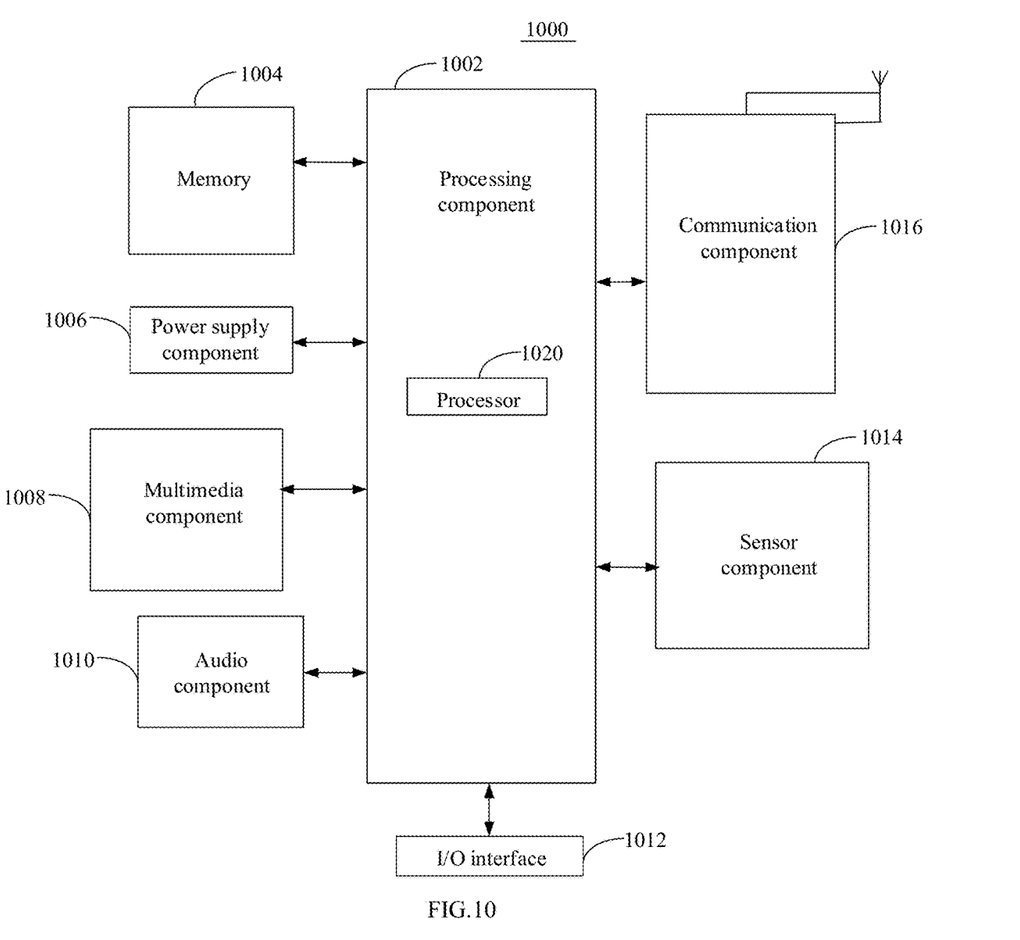
FIG. 10 is a schematic diagram of a structure of an apparatus suitable for determining a TTI according to another example of the present disclosure.

FIG. 10 is a schematic diagram of a structure of an apparatus suitable for determining a TTI according to another example of the present disclosure. For example, the apparatus 1000 may be user equipment, such as a smart device, tablet computer and so on.

Referring to FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls overall operations of the apparatus 1000, such as operations associated with display, phone calls, data communications, camera operations, and recording operations. The processing component 1002 may include one or more processors 1020 to execute instructions to complete all or part of the steps of the above methods. In addition, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any application or method operated on the apparatus 1000, contact data, phonebook data, messages, pictures, videos, and so on. The memory 1004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 1006 provides power to different components of the apparatus 1000. The power supply component 1006 may include a power management system, one or more power supplies, and other components associated with generating, managing, and distributing power for the apparatus 1000.

The multimedia component 1008 includes a screen providing an output interface between the apparatus 1000 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1008 may include a front camera and/or a rear camera. The front camera and/or rear camera may receive external multimedia data when the apparatus 1000 is in an operating mode, such as a photographing mode or a video mode. Each of the front camera and the rear camera may be a fixed optical lens system or have focal length and optical zooming capability.

The audio component 1010 is configured to output and/or input an audio signal. For example, the audio component 1010 includes a microphone (MIC). When the apparatus 1000 is in an operating mode, such as a call mode, a recording mode, and a voice recognition mode, the MIC is configured to receive an external audio signal. The received audio signal may be further stored in the memory 1004 or sent via the communication component 1016. In some examples, the audio component 1010 further includes a speaker to output an audio signal.

The I/O interface 1012 may provide an interface between the processing component 1002 and peripheral interface modules. The above peripheral interface modules may include a keyboard, a click wheel, buttons and so on. These buttons may include, but are not limited to, a home button, a volume button, a starting button and a locking button.

The sensor component 1014 includes one or more sensors to provide status assessments of various aspects for the apparatus 1000. For example, the sensor component 1014 may detect the on/off status of the apparatus 1000, and relative positioning of component, for example, the component is a display and a keypad of the apparatus 1000. The sensor component 1014 may also detect a change in position of the apparatus 1000 or a component of the apparatus 1000, a presence or absence of the contact between a user and the apparatus 1000, an orientation or an acceleration/deceleration of the apparatus 1000, and a change in temperature of the apparatus 1000. The sensor component 1014 may include a proximity sensor to detect the presence of a nearby object without any physical contact. The sensor component 1014 may further include an optical sensor, such as a Complementary Metal-Oxide-Semiconductor (CMOS) or Charged Coupled Device (CCD) image sensor which is used in imaging applications. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the apparatus 1000 and other devices. The apparatus 1000 may access a wireless network that is based on a communication standard, such as Wi-Fi, 2G or 3G, or a combination thereof. In an example, the communication component 1016 receives a broadcast signal or broadcast-associated information from an external broadcast management system via a broadcast channel. In an example, the communication component 1016 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 1000 may be implemented by one or more Application Specific Integrated Circuits (ASIC), Digital Signal Processors (DSP), Digital Signal Processing Devices (DSPD), programmable Logic Devices (PLD), Field Programmable Gate Arrays (FPGA), controllers, microcontrollers, microprocessors, or other electronic components for performing the above method of determining a TTI, which includes:

receiving broadcast signaling from a base station;

obtaining second length information for a second TTI in a preset frequency range from the broadcast signaling, where the preset frequency range is within a base station carrier frequency range; and demodulating downlink control signaling from the base station with a length corresponding to the second length information to obtain first length information for a first TTI associated with the user equipment, where the first length information is determined based on a type of a service currently used by the user equipment.

In an example, there is also provided a non-transitory machine-readable storage medium including instructions, such as a memory 1004 including instructions. The above instructions may be executed by the processor 1020 of the apparatus 1000 to perform the above methods. For example, the non-transitory machine-readable storage medium may be a Read-Only Memory (ROM), a Random Access Memory (RAM), a Compact disc ROM (CD-ROM), a magnetic tape, a floppy disk, an optical data storage device and so on. The processor 1020 is configured to:

receive broadcast signaling from a base station;

obtain second length information for a second TTI in a preset frequency range from the broadcast signaling, where the preset frequency range is within a base station carrier frequency range; and demodulate downlink control signaling from the base station with a length corresponding to the second length information to obtain first length information for a first TTI associated with the user equipment, where the first length information is determined based on a type of a service currently used by the user equipment.

The technical solutions provided by examples of the present disclosure may include the following benefits.

Combining with the type of the data service used by the UE, the base station may allocate the first TTI with first length information and a first carrier frequency for the first TTI for the UE. Therefore, the UE uses the TTI with a relatively short length for the latency-sensitive data service and appropriately uses the TTI with a relatively long length for the latency-insensitive data service, so as to ensure that the UE is able to flexibly adjust the length of the TTI when processing the data service.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of determining a transmission time interval (TTI), comprising:

determining, by a base station, a type of a data service used by a user equipment;

allocating, by the base station, first length information for a first TTI and a first carrier frequency for the first TTI to the user equipment based on the type of the data service used by the user equipment; and sending, by the base station, downlink control signaling to the user equipment, wherein the downlink control signaling comprises the first length information and the carrier frequency for the first TTI;

in at least one TTI provided by the base station, determining two adjacent carriers beyond a preset frequency range but within a base station carrier frequency range, wherein the preset frequency range is within the base station carrier frequency range;

for TTIs corresponding to the two adjacent carriers respectively, determining a first time-frequency resource position within an overlapped resource between a physical downlink shared channel of one of the TTIs and a physical downlink control channel of the other of the TTIs; and setting the first time-frequency resource position within the physical downlink shared channel of the one of the TTIs to blank.

2. The method according to claim 1, further comprising:

determining second length information for a second TTI in a preset frequency range for the base station, wherein the preset frequency range is within the base station carrier frequency range; and sending broadcast signaling to a cell, wherein the second length information is carried in the broadcast signaling.

3. The method according to claim 2, wherein a length of the first TTI is an integer multiple or an integer fraction of a length of the second TTI.

4. The method according to claim 3, wherein the length of the first TTI is a multiple of $2^n$ or $\frac{1}{2}^n$ to the length of the second TTI, wherein n is a positive integer.

5. A base station, comprising:

a processor; and a memory to store processor executable instructions;

wherein the executable instructions cause the processor to performing acts comprising:

determining a type of a data service used by user equipment;

allocating first length information for a first TTI and a first carrier frequency for the first TTI to the user equipment based on the type of the data service used by the user equipment;

sending downlink control signaling to the user equipment, wherein the downlink control signaling comprises the first length information and the carrier frequency for the first TTI;

in at least one TTI provided by the base station, determining two adjacent carriers beyond a preset frequency range but within a base station carrier frequency range, wherein the preset frequency range is within the base station carrier frequency range;

for TTIs corresponding to the two adjacent carriers respectively, determining a first time-frequency resource position within an overlapped resource between a physical downlink shared channel of one of the TTIs and a physical downlink control channel of the other of the TTIs; and setting the first time-frequency resource position within the physical downlink shared channel of the one of the TTIs to blank.

6. The base station according to claim 5, wherein the acts further comprise:

determining second length information for a second TTI in a preset frequency range for the base station, wherein the preset frequency range is within the base station carrier frequency range; and sending broadcast signaling to a cell, wherein the second length information is carried in the broadcast signaling.

7. The base station according to claim 6, wherein a length of the first TTI is an integer multiple or an integer fraction of a length of the second TTI.

8. The base station according to claim 7, wherein the length of the first TTI is a multiple of $2^n$ or $½^n$ to the length of the second TTI, wherein n is a positive integer.

* * * * *